United States Patent [19]

Vora et al.

[11] 4,409,064
[45] Oct. 11, 1983

[54] PROCESS FOR CONCENTRATING SULFURIC ACID IN AN EVAPORATOR

[75] Inventors: Suresh M. Vora, Whitehall; William J. Mazzafro, Schnecksville; Pierre L. T. Brian, Allentown; Michael S. K. Chen, Macungie, all of Pa.

[73] Assignee: Air Products and Chemicals, Inc., Allentown, Pa.

[21] Appl. No.: 319,157

[22] Filed: Nov. 9, 1981

Related U.S. Application Data

[63] Continuation of Ser. No. 951,553, Oct. 16, 1978, abandoned.

[51] Int. Cl.³ .......................... B01D 1/00; C01B 17/90
[52] U.S. Cl. ..................................... 159/47.1; 159/31; 55/185; 202/197; 203/12; 203/40; 203/42; 423/522; 423/531
[58] Field of Search ................. 159/DIG. 31, 2, 48 R, 159/48 L, 49; 202/197, 168, 169; 423/531, 522; 203/12, 40, 42; 55/183–185

[56] References Cited

U.S. PATENT DOCUMENTS

| | | | |
|---|---|---|---|
| 3,334,027 | 8/1967 | Goeldner | 159/31 |
| 3,634,201 | 1/1972 | Kehse | 159/48 L |
| 3,661,732 | 5/1972 | Withrow | 159/48 L |
| 3,944,401 | 3/1976 | Dorr et al. | 423/522 |
| 3,970,511 | 7/1976 | Rat et al. | 423/529 |
| 4,138,309 | 2/1979 | Kuhnlein | 423/531 |

Primary Examiner—Wilbur L. Bascomb, Jr.
Attorney, Agent, or Firm—R. L. Brewer; E. E. Innis

[57] ABSTRACT

This invention relates to an improved process for reducing solute in a vapor stream and, particularly, to the adaption of this process in concentrating solutions in an evaporator wherein the solution is heated to volatilize solvent. The improvement for reducing solute in the vapor stream resides in (a) the utilization of a wire mesh mist eliminator pad having a wire diameter of from 0.001–0.05 inches, an interfacial area from 50–200 ft²/ft³, a void space of about 90–99 percent and a packing thickness of 4–16 inches and (b) spraying a liquid through the mist eliminator pad, the liquid being sprayed uniformly over the surface of the mist eliminator pad at a rate of 0.6–2.5 pounds liquid per pound of vapor to provide a wetting rate of 0.1–0.25 gallons per minute per square foot of mist eliminator surface area. The process has been particularly advantageous in the multistage concentration of corrosive products particularly in the concentration of a 60–70% sulfuric acid solution to about 93 percent.

6 Claims, 1 Drawing Figure

U.S. Patent
Oct. 11, 1983
4,409,064
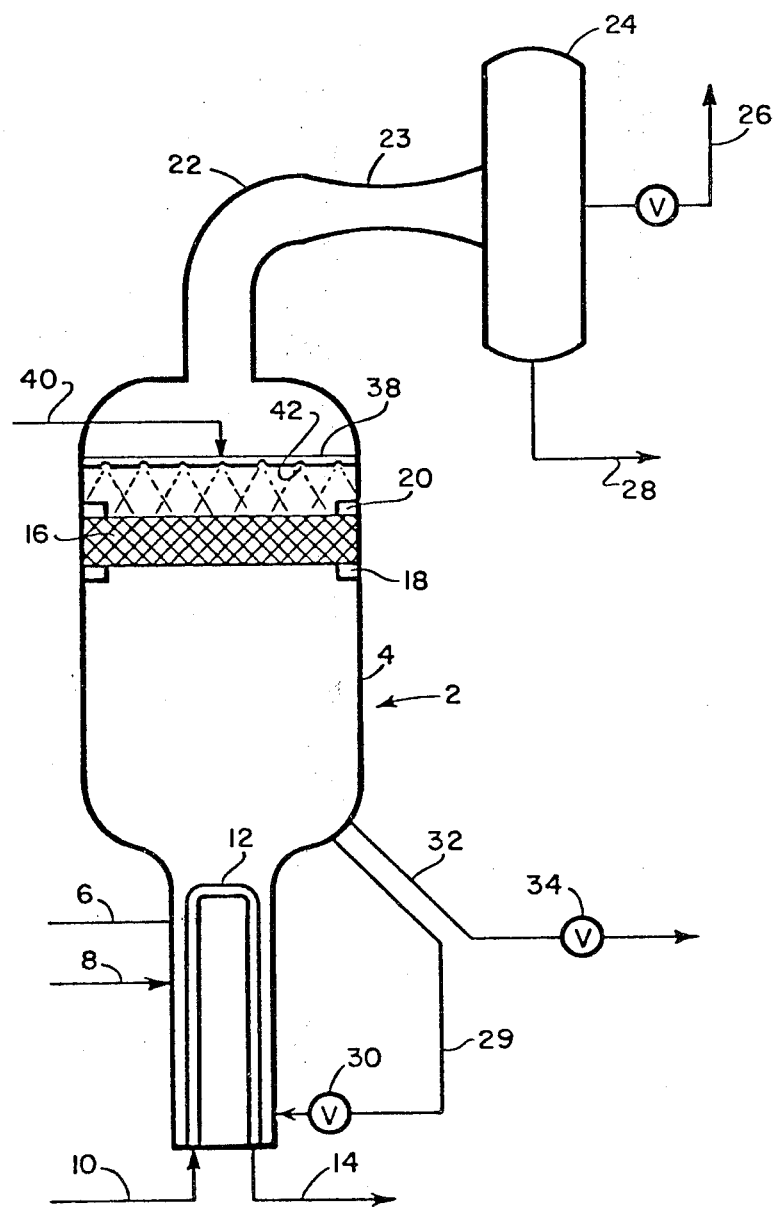

PROCESS FOR CONCENTRATING SULFURIC ACID IN AN EVAPORATOR

This is a continuation of application Ser. No. 951,553 filed Oct. 16, 1978, now abandoned.

BACKGROUND OF THE INVENTION

1. Field of the Invention

This invention relates to an improved process for reducing solute concentration in a vapor stream and particularly to concentrating dilute solutions particularly of corrosive products.

2. Description of the Prior Art

U.S. Pat. No. 3,970,511 discloses a process for concentrating dilute solutions of corrosive products such as sulfuric or phosphoric acid. In the process the dilute solutions are preconcentrated solution is introduced into a tunnel in which it flows in thin layer over successive cascades while being heated by an indirect radiant heating element.

U.S. Pat. No. 3,191,662 discloses a continuous solution concentrator wherein feed is introduced into the top of an evaporator and passed through a nozzle. The resulting droplets then are heated by a surface with evaporation of volatile solvent. Near the bottom of the evaporator there is a mist eliminator pad which serves to coalesce the falling droplets and permit discharge from the column as a concentrated bottoms fraction.

SUMMARY OF THE INVENTION

In a basic process for concentrating a solution in an evaporator, the steps typically comprise: heating the solution to a temperature sufficient to evaporate volatile solvent, collecting the vapor rich in volatile solvent as an overhead fraction, and collecting a concentrated solution as a bottoms fraction. It has also been common practice to utilize a mist eliminator pad in the evaporator to reduce carry-over of entrained product in the overhead. The entrained droplets coalesce on impingement with the pad and are removed prior to discharge of the overhead fraction. The improvement constituting the basis of this invention, which serves to enhance the efficiency of the evaporator by reducing the quantity of vaporized product (solute) collected with the overhead vapor, comprises:

spraying a liquid selected from the group consisting of solvent or solution through the mist eliminator pad at a rate of from 0.6–2.5 pounds liquid per pound of vapor, the liquid being sprayed substantially uniformly over the mist eliminator pad surface to provide a wetting rate of about 0.1–0.35, preferably 0.15–0.25 gallons per minute (gpm) per sq ft of mist eliminator pad surface and utilizing as said mist eliminator pad, a knitted wire mesh mist eliminator pad having a wire diameter from 0.001–0.05″ wire, an interfacial area from 50–200 ft$^2$/ft$^3$, a void space of 90–99 percent and a thickness of from 4–16 inches.

There are several advantages associated with using the mist eliminator pad of the type described as a medium for scrubbing product from the vapor passing through the mist eliminator pad. These advantages include:

a simple and efficient method for reducing the quantity of solute product in the vapor overhead from the evaporator;

an ability to reduce the amount of product in the vapor with very low pressure drop and thus with low energy cost;

the ability to reduce the amount of product in the vapor overhead without a substantial energy cost due to an increased heat load in the evaporator;

an ability to utilize a unique scrubbing system which can be utilized in existing equipment, e.g., distillation columns and evaporators without resort to separate units; and an ability to achieve good efficiency in removal of product with a very small amount of a "packing" material.

THE DRAWING

The FIGURE is a cross-sectional view of an evaporator showing the combination of a mist eliminator pad and a spray device for effecting scrubbing of the vapor phase prior to collecting it as overhead product.

DESCRIPTION OF THE PREFERRED EMBODIMENTS

The process of this invention for reducing solute concentrations in vapor streams can be utilized in many ways, e.g., concentrating a variety of solutions, particularly those where a solute product is dissolved in a volatile solvent, e.g. an organic solvent or water. However, the process has particular advantage in concentrating solutions of sulfuric acid in water and particularly at the higher concentrations, e.g., 81–91%, where sulfuric acid concentration in the overhead may range from 1–15% by weight.

To illustrate the usefulness of the process reference is made to the FIGURE in describing the following concentration process. With respect to the FIGURE, evaporator unit 2 has a body section 4 and a preheat section 6. Feed sulfuric acid, sulfuric acid being the solute and water the solvent, is introduced to evaporator 2 and to preheat section 6 through line 8. Steam is introduced through line 10 to coils 12 and then removed via line 14.

The evaporator is further characterized as having a mist eliminator pad 16 disposed in body 4, and is carried by supports 18 and 20. Its function is to effect coalescence of entrained droplets in the vapor phase prior to exhaustion of the vapor through overhead 22. A steam eductor 23 and condenser 24 (water lines not shown) are utilized to maintain a partial vacuum and facilitate removal of vapor. The vapor from evaporator 2 is condensed in condenser 24 with the vapor being exhausted through line 26 and liquid through line 28. A circulation cycle is maintained in the evaporator with preconcentrated liquid being passed from the body 4 to preheat section 6 via line 29 with the rate of circulation being controlled by valve 30. A concentrated product is removed from body 4 through line 32 with the rate being controlled by valve 34.

Although the above description of the evaporator and its operation are conventional to prior art concentration processes, it is the combination of a particular mist eliminator pad 16 and operation of flow distribution device 38 in accordance with this invention that permits enhanced recovery of product with minimal losses to overhead.

The mist eliminator pad is one which, of course, should be constructed of a material that is inert to the solution vapor or solvent. In the case of sulfuric acid, which is corrosive, the preferred material is tantalum. The mist eliminator pad preferably consists of a multifilament, knitted wire mesh pad having a wire diameter of from 0.001–0.05 inches, and preferably a diameter of about 0.004–0.006. In terms of properties, the mist eliminator pad has an interfacial area of from about 50–200 ft²/ft³, a void space of about 90–99.7 percent, and a density of 3–40 lbs/ft³. In a preferred case the pad is formed from a knitted tube which is flattened, crimped and then assembled into parallel layers of interlocked wire loops. The thickness of the mist eliminator pad can vary from about 4–16 inches but preferably a thickness of about 6–10 inch is used. Although most of the mist eliminator pads have a thickness of at least four inches, it is conceivable that pads one or two inches thick could be used in combination to meet the thickness of 4–16 inches. Accordingly, when used in combination, it is the combined total thickness that is deemed to be the thickness of the pad.

When the interfacial area falls below about 50 sq ft per cu ft of pad, there generally is insufficient surface area to permit removal of entrained droplets, and there is insufficient surface area to permit scrubbing contact with vaporized solute product. On the other hand, as the interfacial area exceeds about 200 ft² per cu ft of pad, the pressure drop becomes too high and thus results in increased energy consumption.

Scrubbing of the vapor stream to reduce solute product in the vapor is accomplished by means of a flow distributor 38. It comprises an elongated tube having a plurality of cross bars in ladder arrangement with a feed inlet 40 through which the scrubbing liquid is passed. A plurality of holes 42 are placed in the elongated tube and cross members for discharge of the scrubbing liquid (dashed line from holes 42). The flow distributor 38 can be of virtually any design, the important factor being that the liquid is uniformly sprayed over mist eliminator pad 16.

In the embodiment shown, the holes are substantially uniformly placed in flow distributor 38 for even distribution of liquid with a hole generally being placed approximately every 7–20 sq ft of pad surface. The hole diameter is determined by calculating the surface area of the pad and then determining how many holes are to be utilized. Uniform liquid distribution through each hole should be achieved, and this can be done by designing the hole diameter so that the pressure drop of the scrubbing liquid through the hole is at least ten times that of the pressure required to estalish the appropriate scrubbing liquid feed rate through feed inlet 40. Typically, in operation, the liquid rate through feed inlet 40 is from about 0.6–2.5 lbs per lb of vapor rising through mist eliminator pad 16. In a preferred case, the liquid rate is about 0.9–1.2 and, preferably, the rate is 1:1 as this is the level where minimum energy is required for the system. Thus, in many cases, the hole diameter will be from about 0.02–0.08 inches in diameter.

The liquid which an be used for scrubbing can be pure solvent or a solution of the solvent and solute product. Of course, as expected, the efficiency of the liquid for scrubbing is much greater when the concentration of solute product in the solvent is low. On the other hand, the head load to the evaporator is increased as the concentration of the solution is reduced because of the increased concentration of solvent that must be evaporated. For purposes of sulfuric acid concentration from 88–93%, the liquid for scrubbing should be from about 60–75 sulfuric acid. This feed concentration provides enough concentration gradient to establish good efficiency in scrubbing without encountering substantial heat load in the evaporator. However, as mentioned, the solvent or solution can be varied in concentration as desired.

The liquid passing through the flow distribution device can be directed in cocurrent or countercurrent relationship to the vapor flow through the pad. Preferably, the flow is countercurrent to the vapor flow as greater efficiency in separation is achieved.

The following examples are provided to illustrate preferred embodiments of the inventions are not intended to restrict the scope thereof.

EXAMPLE 1

The process of this invention can be adapted to a conventional sulfuric acid concentration process as described. In a typical sulfuric acid concentration plant wherein the initial feed sulfuric acid is about 70 percent and the final desired concentration is about 93–95 percent, multi-stage evaporators are utilized. Typically, these stages operate at pressures between 10 to 90 mm of Hg, and at temperatures from 250°–320° F.

The last evaporator stage in the above-described sulfuric acid concentration process was modified as shown in the FIGURE. That stage was adapted with a York 325 tantalum mist eliminator pad having a thickness of 8 inches, a void space of 99%, an interfacial surface area of 110 sq ft per cu ft. The York 325 mist eliminator pad is made of 0.005 inch diameter wire screen and is formed by knitting the wire into a tube, crimping and then forming into a segmented layer pad.

A flow distributor consisting of a central elongated tube with ladder tubes being placed perpendicular to the central elongated tube was constructed and mounted above the mist eliminator pad. The ladder tubes, of course, were cut to the appropriate dimension to form a circular structure and assure that the total surface of the mist eliminator could be sprayed uniformly with a scrubbing medium. The holes were placed to provide one hole per 9 sq inches of pad surface area.

A series of experiments were run and the results of the tests are given in Table 1. During the test period, a 70% sulfuric acid feed was used to scrub the vapor prior to extrusion through overhead 22. The feed temperature, the spray rate in gallons per minute (corresponds to a wetting rate in gpm per square feet of pad surface) and the liquid rate was varied. The feed sulfuric acid was about 89%. The results are shown in Table 1.

TABLE I

| Test | Feed Temp °F. | Wetting Ratio gpm/ft² pad surface | L/G lb liq/lb vap | Expected (no scrubbing) lbs H₂SO₄/hr | Measured lbs H₂SO₄/hr | % Scrubbing |
|---|---|---|---|---|---|---|
| 1 | 90 | 0.085 | 0.8 | 229 | 98 | 57.2 |
| 2a | 92 | 0.13 | 1.0 | 272 | 69 | 74.6 |
| b | 92 | 0.13 | 0.9 | 320 | 64 | 80.0 |
| c | 92 | 0.13 | 1.1 | 321 | 66 | 79.4 |
| d | 96 | 0.13 | 1.2 | 262 | 30 | 88.6 |
| 3 | 92 | 0.195 | 1.8 | 189 | 64 | 66.1 |

TABLE I-continued

| Test | Feed Temp °F. | Wetting Ratio gpm/ft² pad surface | L/G lb liq/lb vap | Expected (no scrubbing) lbs H₂SO₄/hr | Measured lbs H₂SO₄/hr | % Scrubbing |
|---|---|---|---|---|---|---|
| 4a | 92 | 0.255 | 2.1 | 288 | 66 | 77.1 |
| b | 92 | 0.255 | 2.4 | 260 | 60 | 76.9 |
| c | 92 | 0.255 | 1.8 | 310 | 87 | 71.9 |
| d | 92 | 0.26 | 1.5 | 325 | 51 | 84.3 |
| 5a | 138 | 0.085 | 0.6 | 362 | 145 | 60.0 |
| b | 138 | 0.085 | 0.6 | 360 | 159 | 55.8 |
| c | 132 | 0.085 | 0.7 | 327 | 60 | 81.7 |
| 6 | 138 | 0.13 | 1.0 | 338 | 65 | 80.8 |
| 7a | 138 | 0.195 | 1.4 | 325 | 66 | 29.7 |
| b | 138 | 0.195 | 1.4 | 342 | 72 | 78.9 |
| 8a | 138 | 0.255 | 2.1 | 256 | 58 | 77.3 |
| b | 138 | 0.255 | 1.9 | 315 | 67 | 78.7 |

As can be seen from the table, scrubbing efficiency through the mist eliminator pad is extremely high from about 55–90%. The preferred results are obtained where the flow rate is such to provide an of about 0.9–1.2 (see Runs 2b, c and d). At this flow rate, the energy consumption is minimized since one lb of liquid is being introduced for every lb of vapor being removed. Run 6 is also exemplary of similar test conditions except there the feed temperature has been increased.

Quite surprisingly, scrubbing in the specified manner through the mist eliminator pad transformed the pad into a relatively efficient packed column which achieved substantial removal of the sulfuric acid solute from the vapor phase or rather achieved substantial scrubbing efficiency. By operating under the conditions shown, particularly at a wetting rate of about 0.13–0.2 gpm/ft², the number of theoretical units (NTU) calculated was about 1.4. Thus, the height of the theoretical unit (HTU) of the pad was calculated to be about 5.6 inches which is extremely good.

The surprising factor about an HTU of 5.6 inches is that it was achieved with a "packing" of only 8 inches in thickness. Typically, in scubbing operations utilizing a conventional packing material with conventional liquid loadings, an HTU of 5 to 6 inches is achieved when the packing is several feet thick. If the top 8 to 10 inch portion of these columns were evaluated the NTU would be a small fraction.

What is claimed is:

1. A process for concentrating sulfuric acid which comprises:
   (a) introducing an aqueous feed sulfuric acid into an evaporator;
   (b) heating the feed sulfuric acid in said evaporator to a temperature sufficient to evaporate the water and form a vapor rich in water and leave a concentrated bottoms product rich in sulfuric acid;
   (c) passing the vapor rich in water through a knitted wire mist eliminator pad to remove droplets from the vapor stream;
   (d) scrubbing vaporized sulfuric acid from the vapor stream by spraying water or sulfuric acid through the mist eliminator pad at a rate of from 0.6–2.5 pounds liquid per pound of vapor passing through said mist eliminator pad, said liquid being sprayed substantially uniformly over said pad to provide a wetting rate of 0.10–0.35 gallons per minute per square foot of mist eliminator pad surface area, said mist eliminator pad having a wire diameter of 0.001–0.05 inches, and interfacial area of from 50–200 feet squared per cubic foot, a void space of from 90–99.7% and a thickness of 4–16 inches;
   (e) collecting the scrubbed vapor from the mist eliminator pad as an overhead fraction; and
   (f) collecting a concentrated sulfuric acid solution as a bottoms fraction.

2. The process of claim 1 wherein the mist eliminator pad has a thickness of from 6–12 inches and segmented layer construction.

3. The process of claim 2 wherein the liquid spray rate is from 0.9–1.2 lbs liquid per lb of vapor passed through the mist eliminator pad.

4. The process of claim 3 wherein said liquid is sprayed through a flow distributor utilizing a plurality of holes with one hole being positioned for every 7–20 square inches of pad surface.

5. The process of claim 3 wherein said feed solution to be concentrated contains from 80–91 percent sulfuric acid.

6. The process of claim 3 wherein said scrubbing is with sulfuric acid and the sulfuric acid contains from 60–75% sulfuric acid.

* * * * *